United States Patent [19]

Levitan

[11] Patent Number: 5,367,703

[45] Date of Patent: Nov. 22, 1994

[54] METHOD AND SYSTEM FOR ENHANCED BRANCH HISTORY PREDICTION ACCURACY IN A SUPERSCALAR PROCESSOR SYSTEM

[75] Inventor: David S. Levitan, Austin, Tex.

[73] Assignee: International Business Machines Corporation, Armonk, N.Y.

[21] Appl. No.: 2,289

[22] Filed: Jan. 8, 1993

[51] Int. Cl.$^5$ .......................... G06F 9/32; G06F 13/00
[52] U.S. Cl. .................................. 395/800; 395/375; 364/DIG. 1; 364/261.7; 364/261.3; 364/262.6; 364/732.23; 364/231.8; 364/DIG. 2; 364/931.55; 364/938; 364/938.2; 364/957.5; 364/957; 364/960; 364/964.24

[58] Field of Search .............................. 395/800, 375

[56] References Cited

U.S. PATENT DOCUMENTS

| | | | |
|---|---|---|---|
| 4,477,872 | 10/1984 | Losq et al. | 395/375 |
| 4,679,141 | 4/1987 | Pomerene et al. | 395/375 |
| 4,943,908 | 7/1990 | Emma et al. | 395/375 |
| 5,136,697 | 8/1992 | Johnson | 395/375 |
| 5,297,281 | 3/1994 | Emma et al. | 395/650 |
| 5,303,356 | 4/1994 | Vassiliadis et al. | 395/375 |

OTHER PUBLICATIONS

Oehler et al. "IBM Disc System/6000: Architecture and Performance" IEEE Micro Jun. 1991.

Primary Examiner—Alyssa H. Bowler
Assistant Examiner—L. Donaghue
Attorney, Agent, or Firm—Douglas H. Lefeve; Andrew J. Dillon

[57] ABSTRACT

A method and system for enhanced branch history prediction accuracy in a superscalar processor system by maintaining branch history tables which include a separate branch history for each instruction fetch position within a multi-instruction access. In a superscalar processor system which is capable of accessing multiple instructions simultaneously, a branch history table is established which includes a predictive field for each possible instruction fetch position within a multi-instruction access. Each group of predictive fields is accessed within the branch history table utilizing a portion of the instruction fetch address, such as the low order address bits. A particular predictive field within the group is then selected which corresponds to the position of the branch instruction within the instruction fetch. The content of the selected predictive field is then utilized to predict whether or not a branch is taken for the corresponding branch instruction. Each predictive field preferably comprises a two bit binary counter which is incremented or decremented in response to a branch being "taken" or "not taken" and then stored again within the branch history table.

10 Claims, 4 Drawing Sheets

| PREDICTIVE FIELD CONTENT | PREDICTION |
|---|---|
| 0 0 | STRONG - NOT TAKEN |
| 0 1 | WEAK - NOT TAKEN |
| 1 0 | WEAK - TAKEN |
| 1 1 | STRONG - TAKEN |

METHOD AND SYSTEM FOR ENHANCED BRANCH HISTORY PREDICTION ACCURACY IN A SUPERSCALAR PROCESSOR SYSTEM

BACKGROUND OF THE INVENTION

1. Technical Field

The present invention relates in general to an improved data processing system and in particular to a method and system for improved branch history prediction in a data processing system. Still more particularly, the present invention relates to an improved method and system for enhanced branch history prediction in a superscalar processor system which is capable of simultaneously dispatching a plurality of instructions.

2. Description of the Related Art

Designers of modern state-of-the-art data processing systems are continually attempting to enhance the performance aspects of such systems. One technique for enhancing data processing system efficiency is the achievement of short cycle times and a low Cycles-Per-Instruction (CPI) ratio. An excellent example of the application of these techniques to an enhanced data processing system is the International Business Machines Corporation RISC System 6000 (RS/6000) computer. The RS/6000 system is designed to perform well in numerically intensive engineering and scientific applications as well as in multi-user, commercial environments. The RS/6000 processor employs a superscalar implementation, which means that multiple instructions are issued and executed simultaneously.

The simultaneous issuance and execution of multiple instructions requires independent functional units that can execute concurrently with a high instruction bandwidth. The RS/6000 systems achieves this by utilizing separate branch, fixed point and floating point processing units which are pipelined in nature. In such systems a significant pipelined delay penalty may result from the execution of a so-called "conditional branch" instruction. Conditional branch instructions are instructions which dictate the taking of a specified conditional branch within an application in response to a selected outcome of the processing of one or more other instructions. Thus, by the time a conditional branch instruction propagates through a pipeline queue to an execution position within the queue, it will have been necessary to load instructions into the queue behind the conditional branch instruction prior to resolving the conditional branch, in order to avoid run-time delays.

One attempt at minimizing this run-time delay in pipelined processor systems involves the provision of an alternate instruction queue. Upon the detection of a conditional branch instruction within the primary instruction queue, the sequential instructions following the conditional branch instruction within the queue are immediately purged and loaded into the alternate instruction queue. Target instructions for a predicted conditional branch are then fetched and loaded into the primary instruction queue. If the predicted conditional branch does not occur, the sequential instructions are fetched from the alternate instruction queue and loaded into the primary instruction queue. While this technique minimizes run-time delay, it requires the provision of an alternate instruction queue and a concomitant increase in the hardware assets required.

Another attempt at minimizing run-time delay in pipelined processor systems involves the utilization of a compiler to insert large numbers of instructions into the queue between a conditional branch instruction and the instruction which generates the outcome which initiates the conditional branch. This technique attempts to resolve the conditional branch and place the appropriate target instructions or sequential instructions into the instruction queue prior to execution of the conditional branch instruction during the delay between execution of the instruction which generates the outcome which initiates the conditional branch and the execution of the conditional branch instruction. In theory, this technique will minimize run-time delay without requiring the provision of an alternate instruction queue; however, it is often difficult to insert sufficient numbers of instructions into the queue to accomplish the necessary delay.

As a consequence, the efficiency of a data processing system may be enhanced by accurately predicting whether or not the application will branch to a specified conditional branch in response to encountering a branch instruction. One technique for predicting whether or not a particular branch will be "taken" or "not taken" is the utilization of so-called "Branch History Tables" (BHT). A Branch History Table is utilized to store the recent history of a particular branch instruction in order to accurately predict whether or not the execution of that instruction will result in a branch within an executing set of instructions. While the provision of branch history tables provides a relatively straightforward technique for minimizing run-time delay, problems exist in superscalar processor systems wherein multiple instructions are fetched within a single access. Depending upon the pipeline in such a system the branch address may not be known until the target address calculation. If the branch address is not known until the target address calculation and the branch prediction is to be done in parallel with the address calculation then branch history table access becomes quite critical.

It should therefore be apparent that a need exists for an improved method and system for predicting the outcome of a branch instruction utilizing a branch history table.

SUMMARY OF THE INVENTION

It is therefore one object of the present invention to provide an improved data processing system.

It is another object of the present invention to provide a method and system for improved branch history prediction in a data processing system.

It is yet another object of the present invention to provide an improved method and system for enhanced branch history prediction in a superscalar data processing system which is capable of simultaneously dispatching a plurality of instructions.

The foregoing objects are achieved as is now described. The method and system of the present invention may be utilized to enhance branch history prediction accuracy in a superscalar processor system by maintaining branch history tables which include a separate branch history for each instruction fetch position within a multi-instruction access. In a superscalar processor system which is capable of accessing multiple instructions simultaneously, a branch history table is established which includes a predictive field for each possible instruction fetch position within a multi-instruction access. Each group of predictive fields is accessed within the branch history table utilizing a portion of the instruction fetch address, such as the low order address bits. A particular predictive field within the group is then selected which corresponds to the position of the branch instruction within the instruction fetch. The content of the selected predictive field is then utilized to predict whether or not a branch is taken for the corresponding branch instruction. Each predictive field preferably comprises a two bit binary counter which is incremented or decremented in response to a branch being "taken" or "not taken" and then stored again within the branch history table.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
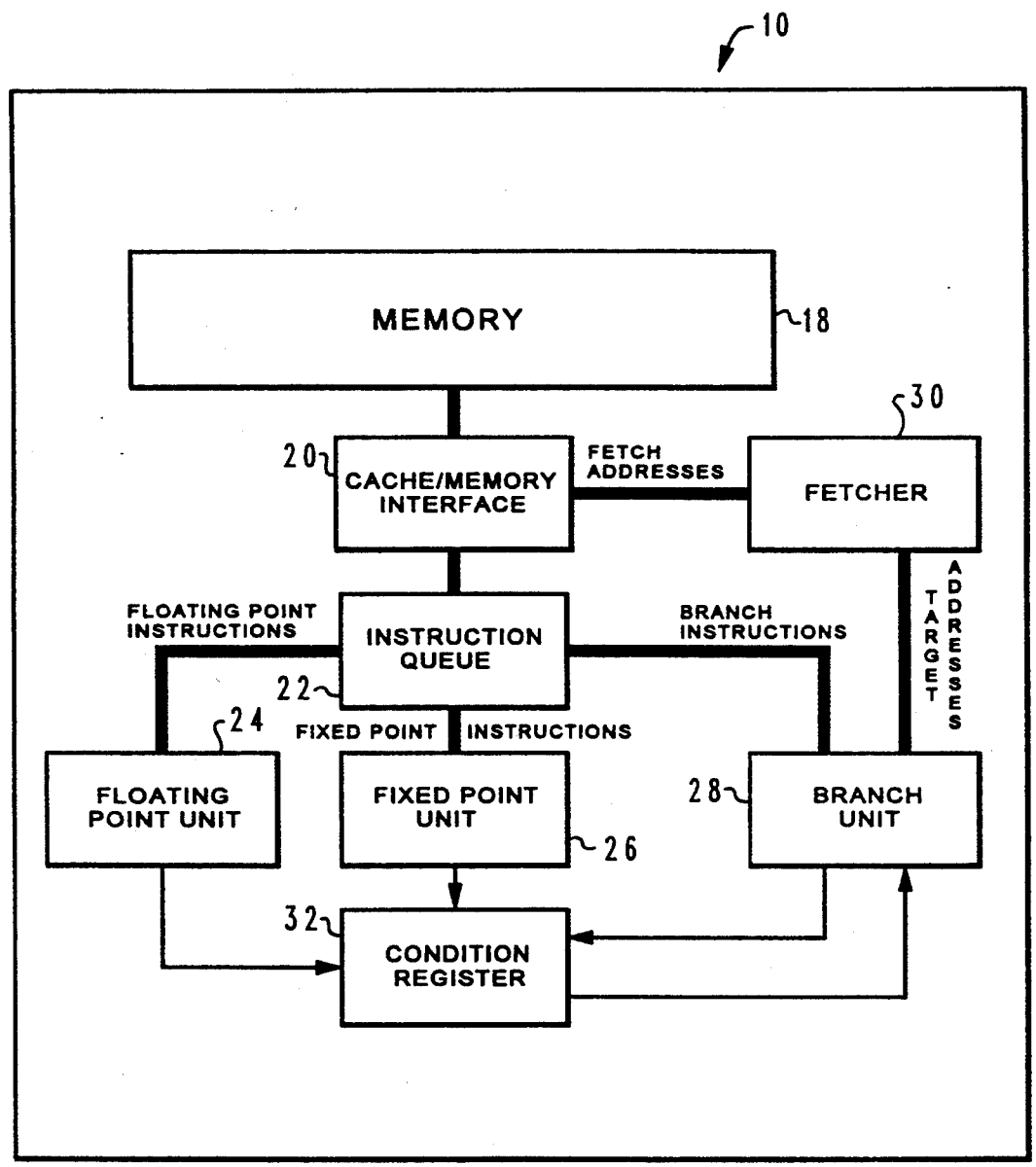
FIG. 1 is a high level block diagram of a superscalar data processing system which may be utilized to implement the method and system of the present invention.

With reference now to the figures and in particular with reference to FIG. 1, there is depicted a high level block diagram of a superscalar computer system 10 which may be utilized to implement the method and system of the present invention. As illustrated, computer system 10 preferably includes a memory 18 which is utilized to store data, instructions and the like. Data or instructions stored within memory 18 are preferably accessed utilizing cache/memory interface 20 in a method well known to those having skill in the art. The sizing and utilization of cache memory systems is a well known subspecialty within the data processing art and not addressed within the present application. However, those skilled in the art will appreciate that by utilizing modern associative cache techniques a large percentage of memory accesses may be achieved utilizing data temporarily stored within cache/memory interface 20.

Instructions from cache/memory interface 20 are typically loaded into instruction queue 22 which preferably includes a plurality of queue positions. In a typical embodiment of a superscalar computer system the instruction queue may include eight queue positions and thus, in a given cycle, between zero and eight instructions may be loaded into instruction queue 22, depending upon how many valid instructions are passed by cache/memory interface 20 and how much space is available within instruction queue 22.

As is typical in such superscalar computer systems, instruction queue 22 is utilized to dispatch instructions to multiple execution units. As depicted within FIG. 1, computer system 10 includes a floating point processor unit 24, a fixed point processor unit 26, and a branch processor unit 28. Thus, instruction queue 22 may dispatch between zero and three instructions during a single cycle, one to each execution unit.

In addition to sequential instructions dispatched from instruction queue 22, so-called "conditional branch instructions" may be loaded into instruction queue 22 for execution by the branch processor. A conditional branch instruction is an instruction which specifies an associated conditional branch to be taken within the application in response to a selected outcome of processing one or more sequential instructions. In an effort to minimize run-time delay in a pipelined processor system, such as computer system 10, the presence of a conditional branch instruction within the instruction queue is detected and an outcome of the conditional branch is predicted. As should be apparent to those having skill in the art when a conditional branch is predicted as "not taken" the sequential instructions within the instruction queue simply continue along a current path and no instructions are altered. However, if the prediction as to the occurrence of the branch is incorrect, the instruction queue must be purged of sequential instruction, which follow the conditional branch instruction in program order and target instructions must be fetched. Alternately, if the conditional branch is predicted as "taken" then the target instructions are fetched and utilized to follow the conditional branch, if the prediction is resolved as correct. And of course, if the prediction of "taken" is incorrect the target instructions must be purged and the sequential instructions which follow the conditional branch instruction in program order must be retrieved.

As illustrated, computer system 10 also preferably includes a condition register 32. Condition register 32 is utilized to temporarily store the results of various comparisons which may occur utilizing the outcome of sequential instructions which are processed within computer system 10.

Thus, floating point processor unit 24, fixed point processor unit 26 and branch processor unit 28 are all coupled to condition register 32. The status of a particular condition within condition register 32 may be detected and coupled to branch processor unit 28 in order to generate target addresses, which are then utilized to fetch target instructions in response to the occurrence of a condition which initiates a branch.

Thereafter, branch processor unit 28 couples target addresses to fetcher 30. Fetcher 30 calculates fetch addresses for the target instructions necessary to follow the conditional branch and couples those fetch addresses to cache/memory interface 20. As should be appreciated by those having skill in the art, if the target instructions associated with those fetch addresses are present within cache/memory interface 20, those target instructions are loaded into instruction queue 22. Alternately, the target instructions may be fetched from memory 18 and thereafter loaded into instruction queue 22 from cache/memory interface 20 after a delay required to fetch those target instructions.

Figure 2A:
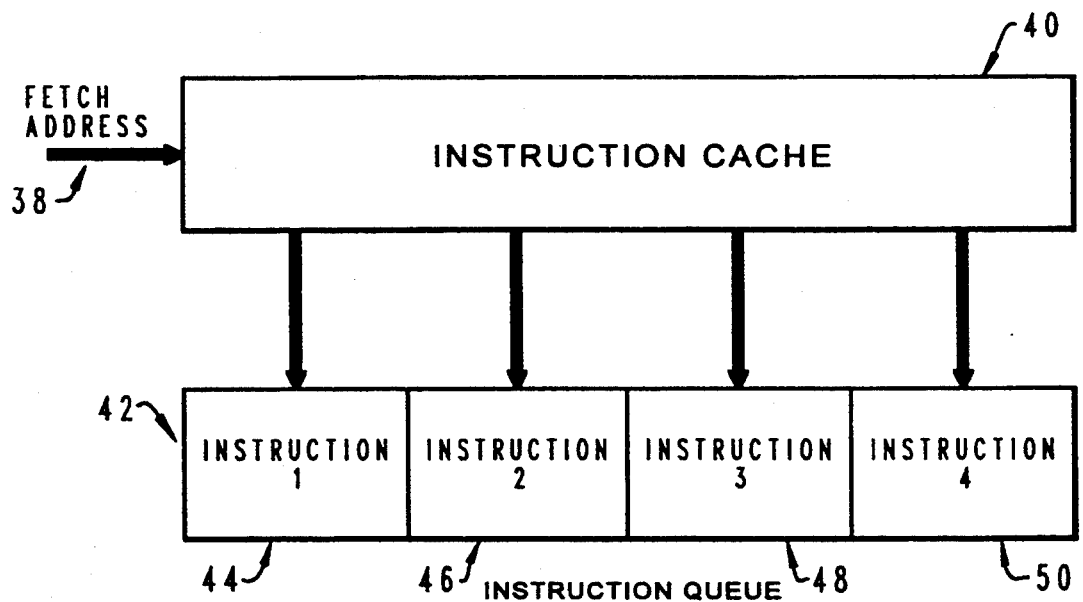
FIGS. 2a and 2b are schematic representations of instruction queues which depict two examples of a simultaneous fetch of multiple instructions in accordance with the method and system of the present invention.
Figure 2B:
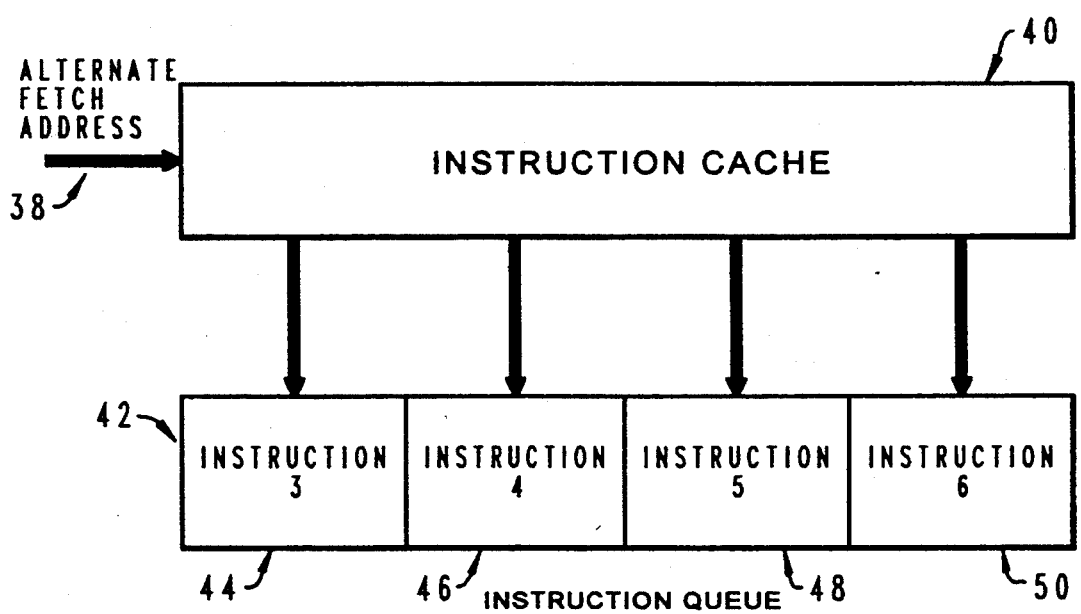

Referring now to FIGS. 2a and 2b, there are depicted schematic representations of two examples of an instruction queue depicting a simultaneous fetch of multiple instructions in accordance with the method and system of the present invention. As illustrated within FIG. 2a, an ordered sequence of instructions may be fetched from instruction cache 40 utilizing a fetch address 38. These instructions are then loaded into instruction queue 42 as depicted. Thus, for a selected fetch address 38 instructions 1, 2, 3 and 4 may be loaded within an ordered sequence into instruction queue 42 at positions 44, 46, 48, and 50.

Referring now to FIG. 2b, it may be seen that a multi-instruction fetch which utilizes an alternate fetch address may result in an ordered sequence of instructions being loaded from instruction cache 40 into instruction queue 42 such that instructions 3, 4, 5, and 6 are loaded into instruction queue 42 at positions 44, 46, 48 and 50, as illustrated. Thus, it may be seen that while instructions 3 and 4 are loaded into instruction queue 42 at positions 48 and 50 within FIG. 2a, the utilization of an alternate fetch address to access an ordered sequence of instructions may result in instructions 3 and 4 being loaded into instruction queue 42 at positions 44 and 46.

The Applicant has discovered that variations in the relative position of an instruction within a multi-instruction access often have a substantial impact upon how a branch instruction at that position should be predicted. Thus, in accordance with the method and system of the present invention, a separate entry within a branch history table is provided for each instruction. That entry will vary in response to variations in the relative position of the instruction, with respect to the other instructions in a multi-instruction access.

Figures 3, 4:
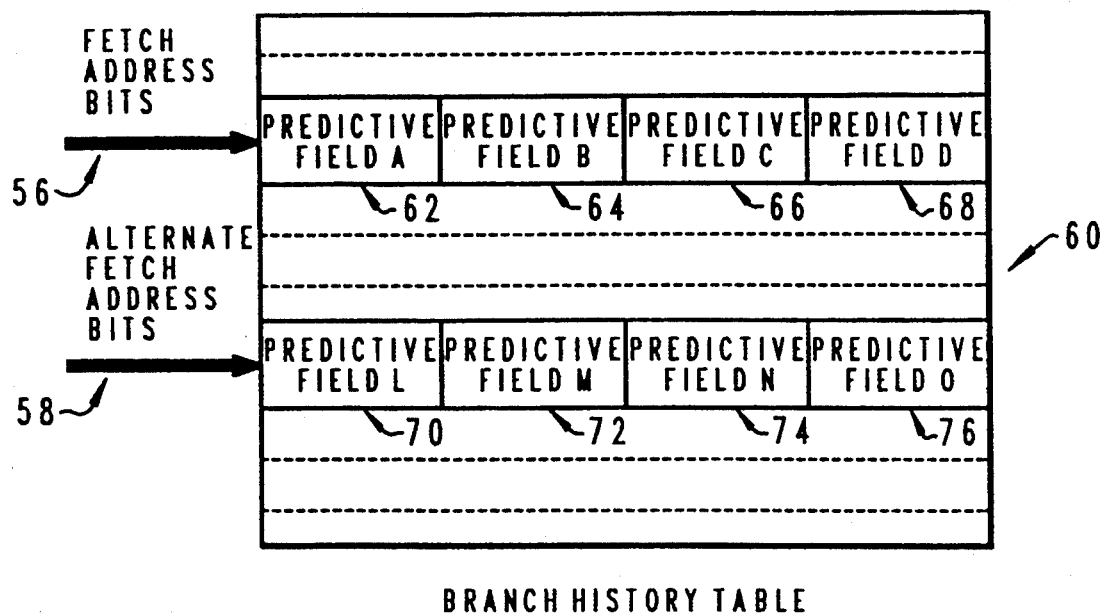
FIG. 3 is a schematic representation of a branch history table wherein each entry includes multiple predictive fields, in accordance with the method and system of the present invention.
FIG. 4 is a table depicting the content of each possible predictive field within the branch history table of FIG. 3 and an associated prediction.

This variation in branch history prediction is best illustrated with respect to FIG. 3 which depicts a schematic representation of a branch history table wherein each entry includes multiple predictive fields, in accordance with the method and system of the present invention. As depicted, a branch history table 60 is illustrated. Branch history table 60 is preferably accessed utilizing a portion of the fetch address which is utilized to access a group of instructions from instruction cache 40 (see FIGS. 2a and 2b) such as, for example, the low order bits thereof. Fetch address bits 56, when utilized to access branch history table 60, will result in the accessing of multiple predictive fields. As illustrated, predictive fields A, B, C and D are thus accessed within branch history table 60 from positions 62, 64, 66, and 68 respectively. Therefore, as illustrated, in a system which may simultaneously access and dispatch four instructions, each entry within branch history table 60 includes four separate predictive fields, each associated with an instruction at a corresponding location within a group of four instructions which have been accessed.

Thus, when utilizing an alternate fetch address, as depicted at reference numeral 58, an entirely different group of predictive fields are accessed. That is, predictive fields L, M, N, and O are accessed from within branch history table 60 at locations 70, 72, 74, and 76.

In the manner described herein, each entry within branch history table 60 includes a group of predictive fields, each predictive field within the group corresponding to a particular instruction position within a multi-instruction access, such as depicted within FIGS. 2a and 2b. In this manner, a separate branch history may be maintained for each instruction which is correlated to the position of the instruction within a multi-instruction access, since the relative position of an instruction within a multi-instruction access often indicates an important function of that instruction's likely branch prediction.

Referring now to FIG. 4, there is depicted a table which illustrates the content of each predictive field within branch history table 60 of FIG. 3. In the depicted embodiment of the present invention, each predictive field within a group of predictive fields within the branch history table of FIG. 3 may comprise a two bit binary counter which is selectively incremented or decremented in response to the execution of a conditional branch instruction resulting in the branch being "taken" or "not taken," in a manner common in the prior art. As depicted within column 92, there are four possible predictive field contents. If the predictive field contains the binary value "0 0" the prediction is a strong prediction that the branch is "not taken." If the predictive field content is a binary value of "0 1" this comprises a weak prediction that execution of the branch instruction will result in the branch being "not taken." Preceding through column 92, a binary content within the predictive field of "1 0" comprises a weak prediction that the branch instruction will result in a branch being "taken" and finally, a binary value of "1 1" comprises a strong prediction that execution of the branch instruction will result in the branch being "taken."

Thus, in a manner which will be explained in greater detail below, by selectively incrementing or decrementing the content of an individual predictive field, the prediction of whether or not a branch associated with the branch instruction which correlates to that predictive field is "taken" or "not taken" may be selectively altered to reflect actual experience with that branch instruction.

Figure 5:
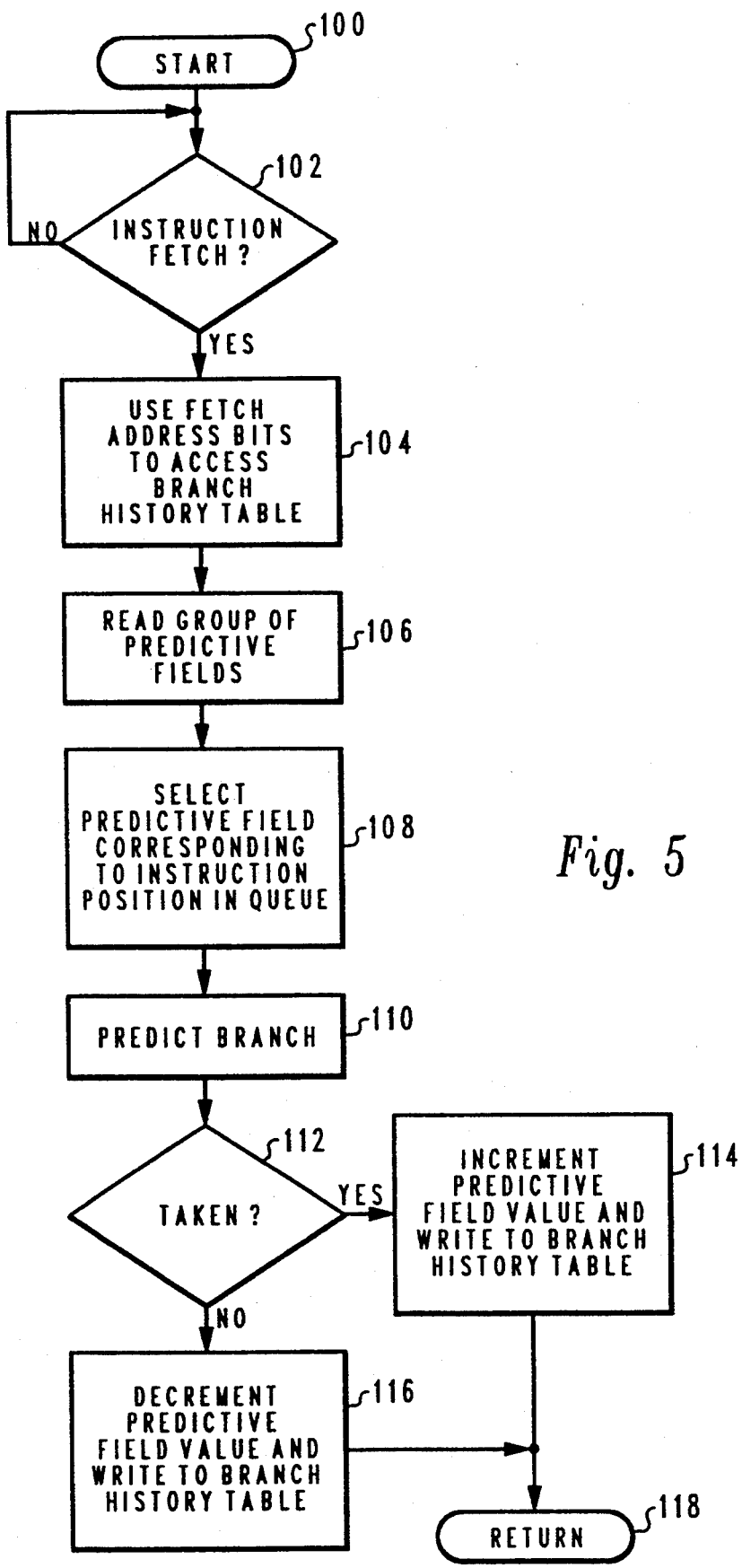
FIG. 5 is a logic flowchart illustrating the process of branch prediction in accordance with the method and system of the present invention.

Finally, with reference to FIG. 5, there is depicted a logic flowchart which illustrates the process of branch prediction in accordance with the method and system of the present invention. As depicted, the process begins at block 100 and thereafter passes to block 102. Block 102 illustrates a determination of whether or not an instruction fetch has occurred. If not, the process merely iterates until such time as an instruction fetch occurs. Next, still referring to block 102, if a multi-instruction fetch has occurred, the process passes to block 104. Block 104 illustrates the utilization of the low order fetch address bits to access branch history table 60 (see FIG. 3). Thereafter, the process passes to block 106. Block 106 illustrates the reading out of a group of predictive fields from within branch history table 60, at a point within branch history table 60 which is indicated by the low order fetch address bits.

Next, the process passes to block 108. Block 108 illustrates the selection of a particular predictive field from within the group of predictive fields accessed utilizing the low order fetch address bits. As described above, the predictive field selected is that predictive field which corresponds to the branch instruction relative position within the multiple instructions within the instruction queue. Thus, for example, if the branch instruction has been fetched to the first position within the instruction queue, the first predictive field will be utilized. Similarly, if the branch instruction has been fetched to the third position within the instruction queue, the third predictive field will be utilized.

Next, the process passes to block 110 which illustrates the predicting of the branch. This is accomplished by assigning a prediction to whether or not execution of the branch instruction will result in a branch being "taken" or "not taken" by utilizing the prediction associated with the predictive field content, as depicted within FIG. 4. Thereafter, the process passes to block 112. Block 112 illustrates a determination of whether or not execution of the branch instruction has actually resulted in a branch being "taken." If so, the process passes to block 114, which illustrates the incrementing of the predictive field value and the writing of a new value for the predictive field to the branch history table. Alternately, if execution of the branch instruction has not resulted in the branch being "taken" the process passes to block 116. Block 116 illustrates the decrementing of the predictive field value, and the writing of the new value for the predictive field to the branch history table. Thereafter, or after incrementing the predictive field value the process passes to block 118 and returns, to await the next instruction fetch. Of course, incrementing or decrementing a predictive field value will have no effect if the content of that field is already at a maximum or minimum value, respectively.

Upon reference to the foregoing those skilled in the art will appreciate that by providing a separate predictive field associated with each relative instruction position within a multi-instruction fetch, the accuracy of branch history prediction may be greatly enhanced in view of the discovery of the Applicant that the likelihood of a branch being "taken" is affected by those circumstances which alter the relative position of the branch instruction within a multi-instruction access.

While the invention has been particularly shown and described with reference to a preferred embodiment, it will be understood by those skilled in the art that various changes in form and detail may be made therein without departing from the spirit and scope of the invention.

I claim:

1. A method for enhanced branch history prediction accuracy in a superscalar processor system which is capable of fetching and dispatching up to N instructions simultaneously, said method comprising the steps of:
    establishing a branch history table containing multiple predictive fields, each of said multiple predictive fields containing data indicative of a likelihood that execution of a particular associated instruction will result in a branch within an executing set of instructions;
    accessing a selected point within said branch history table utilizing at least a portion of a fetch address which is utilized to access an ordered sequence of M instructions within said superscalar processor system;
    reading out an ordered sequence of M predictive fields from said selected point within said branch history table, each one of said ordered sequence of M predictive fields being associated with a particular instruction at a corresponding position within said ordered sequence of M instructions; and
    utilizing an associated one of said M predictive fields to determine a likelihood that execution of a corresponding instruction within said ordered sequence of M instructions will result in a branch within said executing set of instructions, wherein variations in relative position of an instruction within said ordered sequence of M instructions will result in utilization of an alternate predictive field, thereby enhancing predicative accuracy.

2. The method for enhanced branch history predicative accuracy in a superscalar processor according to claim 1, wherein said step of establishing a branch history table containing multiple predictive fields comprises the step of establishing a branch history table containing multiple predictive fields wherein each predictive field comprises a two bit binary counter.

3. The method for enhanced branch history predicative accuracy in a superscalar processor according to claim 1, wherein said step of accessing a selected point within said branch history table utilizing at least a portion of a fetch address which is utilized to access an ordered sequence of M instructions within said superscalar processor system comprises accessing a selected point within said branch history table utilizing low order address bits of a fetch address which is utilized to access an ordered sequence of M instructions within said superscalar processor system.

4. The method for enhanced branch history predicative accuracy in a superscalar processor according to claim 2, further including the step of incrementing said two bit binary counter each time execution of said particular associated instruction results in a branch within said executing set of instructions.

5. The method for enhanced branch history predicative accuracy in a superscalar processor according to claim 4, further including the step of decrementing said two bit binary counter each time execution of said particular associated instruction does not result in a branch within said executing set of instructions.

6. A system for enhanced branch history prediction accuracy in a superscalar processor system which is capable of fetching and dispatching up to N instructions simultaneously, said system comprising:
    means for establishing a branch history table containing multiple predictive fields, each of said multiple predictive fields containing data indicative of a likelihood that execution of a particular associated instruction will result in a branch within an executing set of instructions;
    means accessing a selected point within said branch history, table utilizing at least a portion of a fetch address which is utilized to access an ordered sequence of M instructions within said superscalar processor system;
    means for reading out an ordered sequence of M predictive fields from said selected point within said branch history table, each one of said ordered sequence of M predictive fields being associated with a particular instruction at a corresponding position within said ordered sequence of M instructions; and
    means for utilizing an associated one of said M predictive fields to determine a likelihood that execution of a corresponding instruction within said ordered sequence of M instructions will result in a branch within said executing set of instructions, wherein variations in relative position of an instruction within said ordered sequence of M instructions will result in utilization of an alternate predictive field, thereby enhancing predicative accuracy.

7. The system for enhanced branch history predicative accuracy in a superscalar processor according to claim 6, wherein said means for establishing a branch history table containing multiple predictive fields comprises means for establishing a branch history table containing multiple predictive fields wherein each predictive field comprises a two bit binary counter.

8. The system for enhanced branch history predicative accuracy in a superscalar processor according to claim 6, wherein said means for accessing a selected point within said branch history table utilizing at least a portion of a fetch address which is utilized to access an ordered sequence of M instructions within said superscalar processor system comprises means for accessing a selected point within said branch history table utilizing low order address bits of a fetch address which is utilized to access an ordered sequence of M instructions within said superscalar processor system.

9. The system for enhanced branch history predicative accuracy in a superscalar processor according to claim 7, further including means for incrementing said two bit binary counter each time execution of said particular associated instruction results in a branch within said executing set of instructions.

10. The method for enhanced branch history predicative accuracy in a superscalar processor according to claim 9, further including means for decrementing said two bit binary counter each time execution of said particular associated instruction does not result in a branch within said executing set of instructions.

* * * * *